(12) United States Patent
Oh

(10) Patent No.: US 6,686,971 B2
(45) Date of Patent: Feb. 3, 2004

(54) DEVICE AND METHOD FOR DECODING TELEVISION VIDEO SIGNAL

(75) Inventor: Heung Chul Oh, Kwachon-shi (KR)

(73) Assignee: LG Electronics Inc., Seoul (KR)

( * ) Notice: Subject to any disclaimer, the term of this patent is extended or adjusted under 35 U.S.C. 154(b) by 343 days.

(21) Appl. No.: 09/761,905

(22) Filed: Jan. 17, 2001

(65) Prior Publication Data

US 2001/0008428 A1 Jul. 19, 2001

(30) Foreign Application Priority Data

Jan. 17, 2000 (KR) .......................................... 2000-2067

(51) Int. Cl.$^7$ ................................................. H04N 9/64
(52) U.S. Cl. ....................... 348/649; 348/659; 348/660; 348/708
(58) Field of Search ................................. 348/649, 651, 348/654, 659, 660, 708, 713, 645, 646, 655, 656; 345/154; H04N 9/64, 9/67

(56) References Cited

U.S. PATENT DOCUMENTS

| | | | | |
|---|---|---|---|---|
| 5,764,308 A | * | 6/1998 | Lee | 348/649 |
| 5,936,683 A | * | 8/1999 | Lin | 348/659 |
| 6,166,720 A | * | 12/2000 | Sim | 345/154 |
| 6,191,823 B1 | * | 2/2001 | Ahn | 348/554 |
| 6,411,340 B1 | * | 6/2002 | Lee et al. | 348/649 |
| 6,515,714 B1 | * | 2/2003 | Tachibana | 348/654 |
| 6,545,726 B2 | * | 4/2003 | Into | 348/649 |

* cited by examiner

Primary Examiner—Michael H. Lee
Assistant Examiner—Trang U. Tran
(74) Attorney, Agent, or Firm—Lee, Hong, Degerman, Kang & Schmadeka

(57) ABSTRACT

Device and method for decoding a television video signal are suggested. The device includes a tint controller and a color space converter. The tint controller converts a plurality of color space converting coefficients which is used for converting color space signals into R, G, B signals into tint considered coefficients having a tint control considered. On the other hand, the color space converter produces the R, G, B signal displayable on a monitor by using the tint considered coefficients from the tint controller and the color space signals.

3 Claims, 2 Drawing Sheets

DEVICE AND METHOD FOR DECODING TELEVISION VIDEO SIGNAL

BACKGROUND OF THE INVENTION

1. Field of the Invention

The present invention relates to device and method for decoding a television video signal which influences to a picture quality of a television video.

2. Background of the Related Art

Other than a general process for decoding the televison video signal, an analog type NTSC television receiver has device and method for adjusting various parameters which allows the user to select colors of the picture as the user prefers. The parameters which the user can control with the NTSC television receiver are a hue, a contrast, a brightness, and saturation, and etc. The future television receivers are required to be provided with such features, too. Besides a circuit for digital decoding the television video signal, the digital television receiver is required to be provided with a separate circuit for controlling the parameters, which makes a system of the televison receiver more complicate at the end.

SUMMARY OF THE INVENTION

Accordingly, the present invention is directed to device and method for decoding a television video signal that substantially obviates one or more of the problems due to limitations and disadvantages of the related art.

An object of the present invention is to provide a method for decoding a television video signal in a televison receiver which can control tint with easy.

Another object of the present invention is to provide a device for decoding a television video signal in a televison receiver which has a tint control function.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for decoding a television video signal in a televison receiver includes a simple circuit added before a Color Space Converter (CSC) which is essential for a TV video signal decoder in a DTV receiver, thereby permitting a tint control of the digital video signal at the DTV video signal decoder chip.

The decoder includes a tint controller and a color space converter. The tint controller converts 'n×n' color space converting coefficients which are used for converting '1×n' color space signals into '1×n' R, G, B signals into 'n×n' tint considered coefficients for tint control by using a sine theta value and a cosine theta value, both of which are variables, and the color space converter produces the '1×n' R, G, B signals displayable on a monitor by using the 'n×n' tint considered coefficients from the tint controller and the color space signals.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
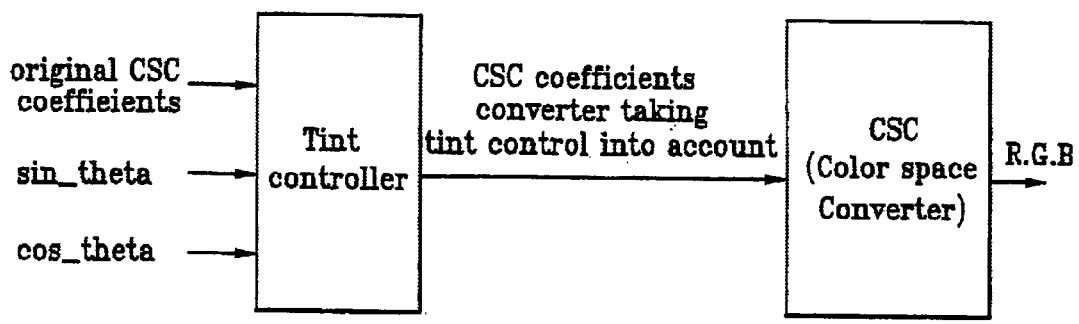
FIG. 1 illustrates a diagram showing a system of a decoder having a tint control function in accordance with a preferred embodiment of the present invention.

Reference will now be made in detail to the preferred embodiments of the present invention, examples of which are illustrated in the accompanying drawings. Decoder and decoding method for controlling a tint by using a CSC (Color Space Converter) of the present invention will be explained, with reference to FIGS. 1~3. FIG. 1 illustrates a diagram showing a system of a decoder having a tint control function in accordance with a preferred embodiment of the present invention.

Referring to FIG. 1, the decoder having a tint control function in accordance with a preferred embodiment of the present invention includes a tint controller 1 and a CSC 2. The tint controller 1 converts a plurality of original CSC coefficients into coefficients having a tint control taken into account by using the plurality of original CSC coefficients, sine theta values, and cosine theta values. The detailed operation of the tint controller 1 will be explained, later. On the other hand, the CSC 2 converts Y, Cb, Cr color space components to R, G, B color space components for display on a monitor. Functions of the tint controller 1 and the CSC 2 will be described more. Both the tint controller 1 and the CSC 2 use the fact that a digital televison video signal is processed into a luminance signal component Y and chrominance signal component C for easy compression and reproduction. The present invention utilizes this fact.

Human eyes are sensitive to a luminance signal component Y more than a chrominance signal component 'C'. Therefore, in processing the television video signal, more attention is paid to the luminance signal component 'Y' than the chrominance signal component 'C'. Accordingly, in processing the digital television video signal, of numerous color spaces, a YCbCr color space is selected. In general, since a final output terminal of the monitor receives a RGB color space mostly, the television video signal processed in the YCbCr color space is converted into a video signal of the RGB color space component through the CSC 2. Equations (1), (2), and (3) below are according to ITU BT. 709 standards which are used widely as international standards.

$$Y = 0.2125R + 0.7154G + 0.0721B \tag{1}$$

$$Cb = 0.5(B-Y)/1-0.0721 \tag{2}$$

$$Cr = 0.5(R-Y)/1-0.2125 \tag{3}$$

Figure 2:
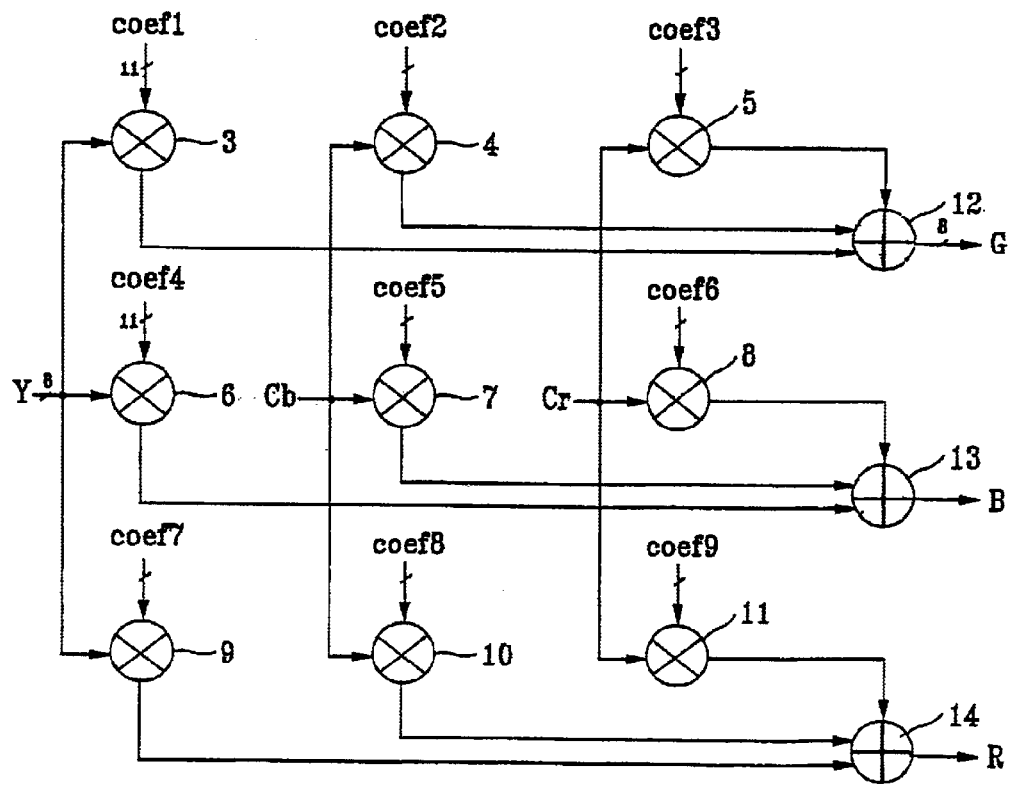
FIG. 2 illustrates a diagram showing a detailed circuit of the CSC in FIG. 1; and, FIG. 3 illustrates a diagram showing a detailed circuit of the tint controller in FIG. 1.

FIG. 2 illustrates a diagram showing a detailed circuit of the CSC 2 in FIG. 1.

In the preferred embodiment of the present invention, conversion between the YCbCr color space and the RGB color space is conducted by using a 3×3 matrix. That is, as shown in FIG. 2, the CSC 2 includes a first multiplier 3 for multiplying a first coefficient coef1 and a luminance signal component Y, a second multiplier 4 for multiplying a second coefficient coef2 and a chrominance signal component Cb, a third multiplier 5 for multiplying a third coefficient coef3 and a chrominance signal component Cr, a fourth multiplier 6 for multiplying a fourth coefficient coef4 and the luminance signal component Y, a fifth multiplier 7 for multiplying a fifth coefficient coef5 and the chrominance signal component Cb, a sixth multiplier 8 for multiplying a sixth coefficient coef6 and the chrominance signal component Cr, a seventh multiplier 9 for multiplying a seventh coefficient coef7 and a luminance signal component Y, an eighth multiplier 10 for multiplying an eighth coefficient coef8 and the chrominance signal component Cb, a ninth multiplier 9 for multiplying a ninth coefficient coef9 and the chrominance signal component Cr, a first adder 12 for adding signals from the first to third multipliers 3, 4, 5 to provide the component 'G', a second adder 13 for adding signals from the fourth to sixth multipliers 6, 7, 8 to provide the component 'B', and a third adder 14 for adding signals from the seventh to ninth multipliers 9, 10, 11 to provide the component 'R'. As described, the first to ninth coefficients, the CSC coefficients converted taken the tint control into account, are obtained at the tint controller 1. In the present invention, the coefficients in the 3×3 matrix are expressed in 11 bit precision values. The precision values which are decimal values are obtained from the equations (1), (2), (3), to which a 256 is multiplied. If least significant 8 bits in a final operation result after being passed through the multipliers and the adders are abandoned, the operation corresponds to division of the final operation result value by 256. That is, only an 8 bit MSB (Most Significant Bit) portion is taken from the final operation result. The circuit in FIG. 2 may be expressed by the following equation (4)

$$\begin{pmatrix} G \\ B \\ R \end{pmatrix} = \begin{pmatrix} CSC_{coef1} & CSC_{coef2} & CSC_{coef3} \\ CSC_{coef4} & CSC_{coef5} & CSC_{coef6} \\ CSC_{coef7} & CSC_{coef8} & CSC_{coef9} \end{pmatrix} \begin{pmatrix} Y \\ C_b \\ C_r \end{pmatrix} \quad (4)$$

The coefficients in the equation (4) are expressed, not as constants, but as variables, for generalizing the color space conversion process, more than the (CSC). The conversion between the YCbCr color space and the RGB color space can be conducted according to standards having slightly modified coefficients, such as ITU-R BT.601 used in the NTSC television receiver, other than the ITU-R BT.709 standards (mostly for high definition television) described before. Other than the YCbCr and the RGB color spaces, there may be a variety of color spaces, such as YUV, YIQ, and YDbDr. As described, conversions between the variety of color spaces are possible only when proper coefficients are obtained by using the 3×3 matrix. In the tint control, only the chrominance signal components Cb and Cr are converted according to a fixed rule, while the luminance signal component is left as it is, in a concept of a rotatory translation with respect to the chrominance signal components Cb and Cr in fact, which can be expressed as an equation (5), below.

$$Cb = Cb^* \cos\theta + Cr^* \sin\theta, \quad (5)$$

$$Cr = -Cb^* \sin\theta + Cr^* \cos\theta.$$

The above equation (5) may be transformed to an equation (6) below if the equation (5) is to include the color space YCbCr inclusive of the luminance component Y.

$$\begin{pmatrix} Y' \\ Cb' \\ CR' \end{pmatrix} = \begin{pmatrix} 1 & 0 & 0 \\ 0 & \cos\theta & \sin\theta \\ 0 & -\sin\theta & \cos\theta \end{pmatrix} \begin{pmatrix} Y \\ Cb \\ Cr \end{pmatrix} \quad (6),$$

Both the CSC equation (4) and the tint control equation (6) are expressed by the coefficient equation of the 3×3 matrix in common. Therefore, considering only the tint control function, it seems that the tint control function can be successfully implemented, on the condition that proper coefficients are provided to the CSC. However, since the CSC conversion and the tint control are in general required to be conducted simultaneously in processing the digital television video signal, a trouble may be occurred if the digital television receiver is equipped with the CSC only. Nevertheless, it may also be a problem if the digital television receiver is equipped with one more CSC. Equipping one more CSC is a waste of resource because most of the tint coefficients are determined in advance. Therefore, for conducting the tint control, rather than adding one more CSC to the digital television receiver, noticing that the equations (4) and (6) are conducted in the sequence, operations only on coefficient portions of the equations (4) and (6) are conducted. Then, a result of the operation is provided as final coefficients of the CSC 2. In other words, data on the color space YCbCr passed through the decoding process is converted into data on a color space Y'Cb'Cr' at the tint controller 1 according to the tint control of the equation (6), and converted into RGB data again at the CSC 2. Then, the RGB data is displayed on the monitor. The foregoing whole tint control process and the CSC process can be expressed by an equation (7), below.

$$\begin{pmatrix} G \\ B \\ R \end{pmatrix} = \begin{pmatrix} coef1 & coef2 & coef3 \\ coef4 & coef5 & coef6 \\ coef7 & coef8 & coef9 \end{pmatrix} \begin{pmatrix} 1 & 0 & 0 \\ 0 & \cos t & \sin t \\ 0 & -\sin t & \cos t \end{pmatrix} \begin{pmatrix} Y \\ C_b \\ C_r \end{pmatrix} \quad (7)$$

$$= \begin{pmatrix} coef1 & [coef2*\cos t - coef3*\sin t] & [coef2*\sin t - coef3*\cos t] \\ coef4 & [coef5*\cos t - coef6*\sin t] & [coef5*\sin t - coef6*\cos t] \\ coef7 & [coef8*\cos t - coef9*\sin t] & [coef8*\sin t - coef9*\cos t] \end{pmatrix} \begin{pmatrix} Y \\ C_b \\ C_r \end{pmatrix}$$

The 3×3 matrix part in the equation 7 is the CSC coefficient part converted considering the tint control of the original CSC coefficients. Sint in the equation (7) denotes sine theta, and cost denotes cosine theta. It can be known that the variables in the equation (7) are obtained by providing two variables of sint and cost to the nine CSC coefficients for tint control operation. The operation for producing the nine new converted CSC coefficients is not required to be carried out at the same time.

Figure 3:
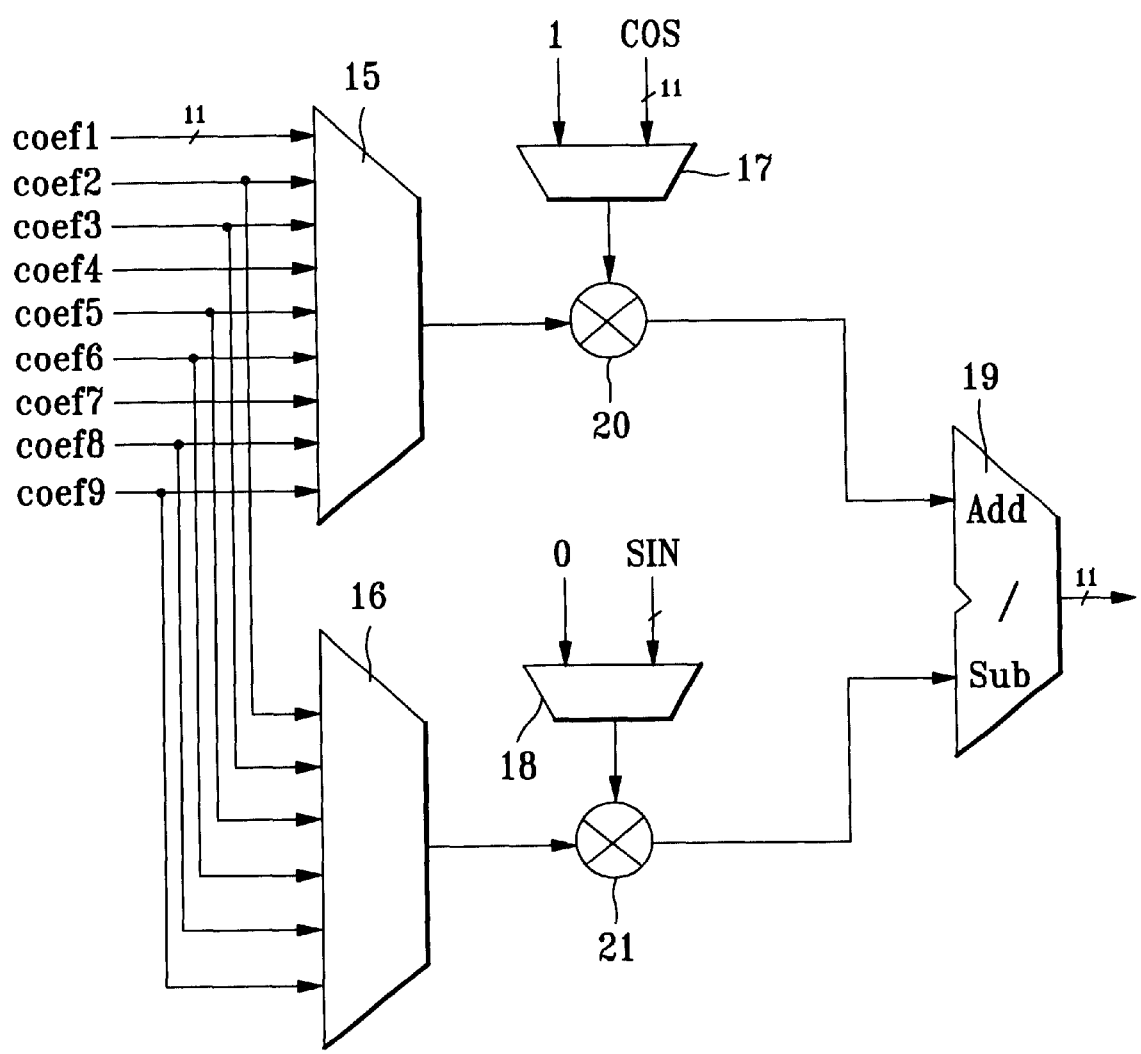

In the present invention, a circuit as shown in FIG. 3 is applied to the controller 1 as shown in FIG. 1.

Referring to FIGS. 3 and 1, the original first to ninth CSC coefficients coef1~coef9 are provided to two multiplexers 15 and 16 in parallel, while the variable cost and a first selection signal (for example, a logic signal 1) are provided to the multiplexer 17 in parallel and the variable sint and a second selection signal (for example, a logic signal 0) are provided to the multiplexer 18 in parallel. Accordingly, by varying the selection signals by means of the four multiplexers 15, 16, 17, 18 at every clock appropriately, one of the converted CSC coefficient values for the tint control can be generated at the tint controller 1 at every clock. As described, the tint controller 1 finishes calculation of the tint controlling CSC coefficients just within total nine clock cycle. Alike the occasion of the original CSC coefficient generation, the variables sint and cost are decimal values, too. Therefore, in the present invention, 256 is multiplied to the variables, and least significant 8 bits are abandoned while only Most Significant Bits (MSB) are taken from a final result of calculation. Accordingly, only MSBs are taken from values (256*coef1, 256*coef4, 256*coef7) obtained by multiplying 256 to the final equation (7) as the tint control CSC coefficients (coef1, coef4, and coef7). Eventually, all the nine converted CSC coefficients obtained finally are MSBs.

In summary of the tint controller in a digital televison receiver of the present invention, the CSC 2 includes total nine multipliers and three adders as shown in FIG. 2. As shown in FIG. 3, by adding two multipliers, one operator for conducting adding and subtracting operations, and only four multiplexers, the tint controller 1 can conduct a required service adequately.

As has been explained, the device and method for decoding a television video signal of the present invention have the following advantages.

First, the present invention permits the tint control only by using the CSC which is essential in processing the digital television video signal without addition of a separate device.

Second, by permitting arbitrary application of the CSC coefficient, the tint function control by using a variety of colors is made possible.

Third, by setting up the tint control function in a decoding chip of the digital television receiver which decodes the televison video signal, the television receiver circuit can be simplified.

It will be apparent to those skilled in the art that various modifications and variations can be made in the device and method for decoding a television video signal of the present invention without departing from the spirit or scope of the invention. Thus, it is intended that the present invention cover the modifications and variations of this invention provided they come within the scope of the appended claims and their equivalents.

What is claimed is:

1. A device for decoding a television video signal, the device comprising:
    a tint controller for converting a plurality of color space converting coefficients which are used for converting a color space signal into R, G, B signals into tint considered coefficients for tint control by using a sine theta value and a cosine theta value, both of which are variables, wherein the tint controller comprises:
        a first multiplexer and a second multiplexer each for receiving a first to a ninth color space converting coefficients in parallel:
        a third multiplexer for receiving the first variable sine theta value and the first selection signal in parallel;
        a fourth multiplexer for receiving the second variable cosine theta value and the second selection signal in parallel;
        a first multiplier for multiplying outputs of the first multiplexer and the third multiplexer;
        a second multiplier for multiplying outputs of the second multiplexer and the fourth multiplexer; and,
        an operator for carrying out an operation in which outputs of the first multiplier and the second multi-
        plier are summed at one side and the outputs of the first multiplier and the second multiplier are subtracted at the other side; and,
    a color space converter for producing the R, G, B signals displayable on a monitor by using the tint considered coefficients from the tint controller and the color space signals.

2. A device as claimed in claim 1, wherein the color space converter comprises:
    a first multiplier for multiplying a first tint considered coefficient and a luminance signal component;
    a second multiplier for multiplying a second tint considered coefficient and a chrominance signal component;
    a third multiplier for multiplying a third tint considered coefficient and a chrominance signal component;
    a fourth multiplier for multiplying a fourth tint considered coefficient and the luminance signal component;
    a fifth multiplier for multiplying a fifth tint considered coefficient and the chrominance signal component;
    a sixth multiplier for multiplying a sixth tint considered coefficient and the chrominance signal component;
    a seventh multiplier for multiplying a seventh coefficient and a luminance signal component;
    an eighth multiplier for multiplying an eighth tint considered coefficient and the chrominance signal component;
    a ninth multiplier for multiplying a ninth tint considered coefficient and the chrominance signal component;
    a first adder for adding signals from the first to third multipliers to provide the component 'G' for display;
    a second adder for adding signals from the fourth to sixth multipliers to provide the component 'B' for display; and
    a third adder for adding signals from the seventh to ninth multipliers to provide the component 'R' for display.

3. A method for decoding a television video signal, comprising the steps of:
    arranging 'n×n' color space coefficients for converting '1×n' color space signals into '1×n R, G, B signals;
    multiplying tint controlling 'n×n' variables inclusive of sine theta values and cosine theta values to the color space coefficients, to provide 'n×n' tint considered coefficients, wherein the 'n×n' variables are $$\begin{pmatrix} 1 & 0 & 0 \\ 0 & \cos\theta & \sin\theta \\ 0 & -\sin\theta & \cos\theta \end{pmatrix}$$

and the 'n×n' tint considered coefficients are $$\begin{pmatrix} coef1 & [coef2*cost - coef3*sint] & [coef2*sint - coef3*cost] \\ coef4 & [coef5*cost - coef6*sint] & [coef5*sint - coef6*cost] \\ coef7 & [coef8*cost - coef9*sint] & [coef8*sint - coef9*cost] \end{pmatrix};$$

and;
    multiplying the 'n×n' tint considered coefficients and the '1×n' color space signals, to obtain the '1×n R, U, B signals for display.

* * * * *